(12) United States Patent
Kincaid

(10) Patent No.: US 6,272,220 B1
(45) Date of Patent: Aug. 7, 2001

(54) ELECTRONICALLY SWITCHED OPTICALLY COUPLED LINE INTERFACE

(75) Inventor: Darin Kincaid, Coppell, TX (US)

(73) Assignee: Sentient Communications, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/108,562

(22) Filed: Jul. 1, 1998

(51) Int. Cl.[7] .................... H04M 1/00; H04M 11/00
(52) U.S. Cl. .................. 379/399; 379/379; 379/93.05
(58) Field of Search ............................ 379/379, 382, 379/377, 386, 387, 399, 402, 412, 414, 418, 93.05–93.07, 93.37, 424

(56) References Cited

U.S. PATENT DOCUMENTS 5,020,100 * 5/1991 Gardiner .................. 379/379
6,192,125 * 2/2001 Norsworthy et al. ........ 379/399

* cited by examiner

Primary Examiner—Wing F. Chan
(74) Attorney, Agent, or Firm—Pedro P. Hernandez; W. James Brady, III; Frederick J. Telecky, Jr.

(57) ABSTRACT

An optocoupled line circuit is arranged with a diode bridge providing uniform direction current flow so as to eliminate the mechanical switch hook contact of the prior art. A zener diode is used to bridge a clipped version of AC ringing current across the optocoupler when the circuit is in the on-hook condition. Current presented to the optocoupler from a line control device allows current to flow from the telephone line through the line interface circuit.

23 Claims, 2 Drawing Sheets

ELECTRONICALLY SWITCHED OPTICALLY COUPLED LINE INTERFACE

REFERENCE TO RELATED APPLICATIONS

The present application is being concurrently filed with commonly assigned, U.S. patent application: Ser. No. 09/108,576 entitled OPTICAL COUPLING CIRCUIT FOR A DATA ACCESS ARRANGEMENT (DAA), the disclosure of which is incorporated herein by reference.

TECHNICAL FIELD OF THE INVENTION

This inventor relates to a line interface circuit, and more particularly, to such a circuit in which the mechanical switch hook has been replaced by an electronic circuit.

BACKGROUND OF THE INVENTION

In prior art systems, the hook switch function is typically implemented between the telephone line and the diode bridge using a mechanical connection, such as a relay or the switch hook itself, as shown in FIG. 2. The hook switch relay can be electro-mechanical or optical, but in prior art configuration it must be able to switch current flowing in either direction. This approach is used so that the hook switch relay contact can be bridged by a resistor in series with a capacitor in order for telephone ringing signals to be capacitively coupled into the line circuit while the switch hook contact remains open (BC on-hook condition).

It is desired to replace the mechanical switch hook to alleviate cost and/or size reductions. Any such replacement must handle the power variations and polarity reversals which occur on telephone lines.

SUMMARY OF THE INVENTION

These and other objects, features and technical advantages are achieved by a circuit and method which interfaces between a telephone transmission line and a communication device without using a mechanical contact at the input of the line on circuit. Related patent application Ser. No. 09/108,576 discloses an optically coupled circuit having pairs of optical couplers which provide high voltage isolation in a telephone circuit. The optical coupler pairs are biased such that AC signals are optically coupled across the isolation barrier. The optically coupled data access arrangement is connected to the telephone line through a hookswitch relay which conducts current in either direction when the contacts are closed and conducts no current when the contacts are open.

A diode bridge, in prior art systems, is connected between the transmission line and the DC loop holding circuit of the data access arrangement. The diode bridge functions to ensure that the DC voltage received from the transmission line always has the same polarity when it enters the line matching circuit. Typically the tip connection on a telephone line is considered to be positive for polarity. However, in some cases the ring connection will have a positive polarity. To compensate for ring-positive polarity connections, the diode bridge routes the incoming telephone voltage to the desired side of the line matching circuit.

The present invention uses an optical coupler in between the diode bridge and the remaining portion of the optically coupled data access arrangement circuitry. The purpose of this additional optical coupler is to act as a hookswitch for the circuit. The selected optical coupler need only conduct current in one direction, since the diode bridge ensures that the required current flows through the photo transistor element in the proper direction.

In the present invention, the AC ringing signal cannot be capacitively coupled around the optical coupler performing the hookswitch function due to the diode bridge which causes the current to flow in only one direction through the switch hook optical coupler. The present invention uses a zener diode in series with a resistor in order to couple the telephone ring signal around the optical coupler. The zener diode is selected such that its zener breakdown voltage is greater than the maximum steady state DC voltage of the telephone line when on hook. This method provides a clipped version of the ringing signal at the optically coupled receive output of the circuit which is sufficient to accurately detect ringing as required by a modem connected to the device output of the circuit.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 2:
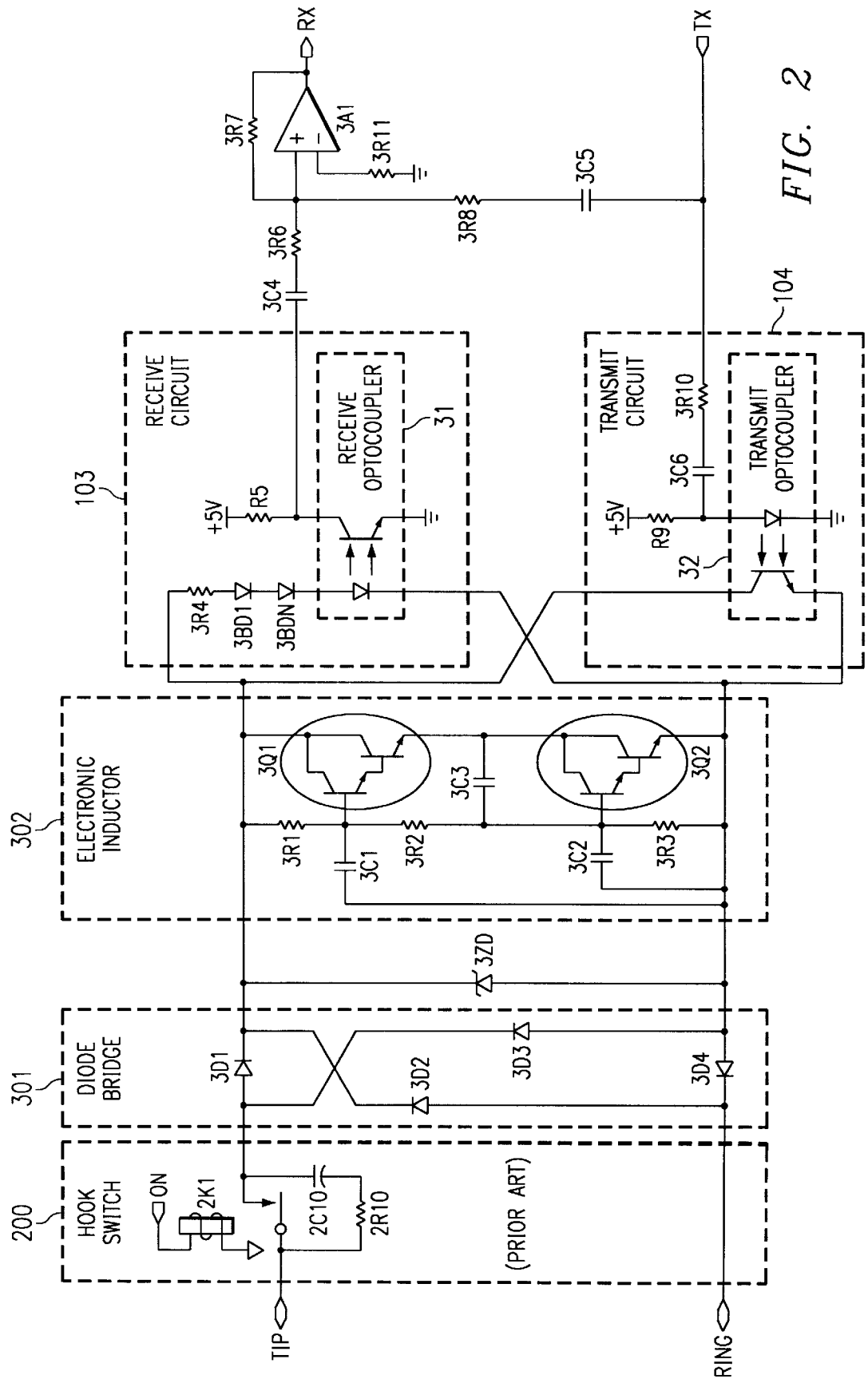
FIG. 2 is a schematic diagram of a line interface circuit having a prior art hook switch.

Prior to discussing the present invention, it may be helpful to review the prior art hook switch arrangement found in FIG. 2. FIG. 2 shows a telephone line impedance matching an isolation circuit for connecting a device, such as a digital signal processor or modem, to the telephone line. When the device (not shown) goes "off-hook," switch 2K1 closes and connects the telephone line to the line interface circuit. Switch 2K1 opens and the connection is broken when the device goes "on-hook." Signals that are received from the telephone line may have a current, which flows either from tip to ring or from ring to tip as described above. In order to establish only one current direction through the line circuit a diode bridge 3D1–3D4 is used.

Following diode bridge 301, incoming loop current passes through electronic inductor 202 to the line interface. When switch 2K1 goes off-hook, the electronic inductor provides a load on the telephone line using transistors 3Q1 and 3Q2. The electronic inductor is designed to draw the required current on the telephone line so that the central office (not shown) can detect when the circuit and the device have been connected to the line. The electronic inductor is connected to the optical hybrid circuit which is described in detail in above-identified patent application Ser. No. 09/108,576.

The circuit is connected to the telephone line via the Tip and Ring connections. The Rx and Tx connections provide a four wire connection to the device such as a CODEC and DSP in a modem. When the circuit is on-hook, no DC loop current flows through the circuit. When a ring signal is present across Tip to Ring, the 2R10 and 2C10 series network will cause the AC ring signal to be capacitively coupled around the contact of relay 2K1. The ring signal is rectified by diode bridge 301 and generates enough rectified AC signal to couple through the line interface circuit to produce a rectified and clipped version of the ring signal at the Rx output of the circuit.

Figure 1:
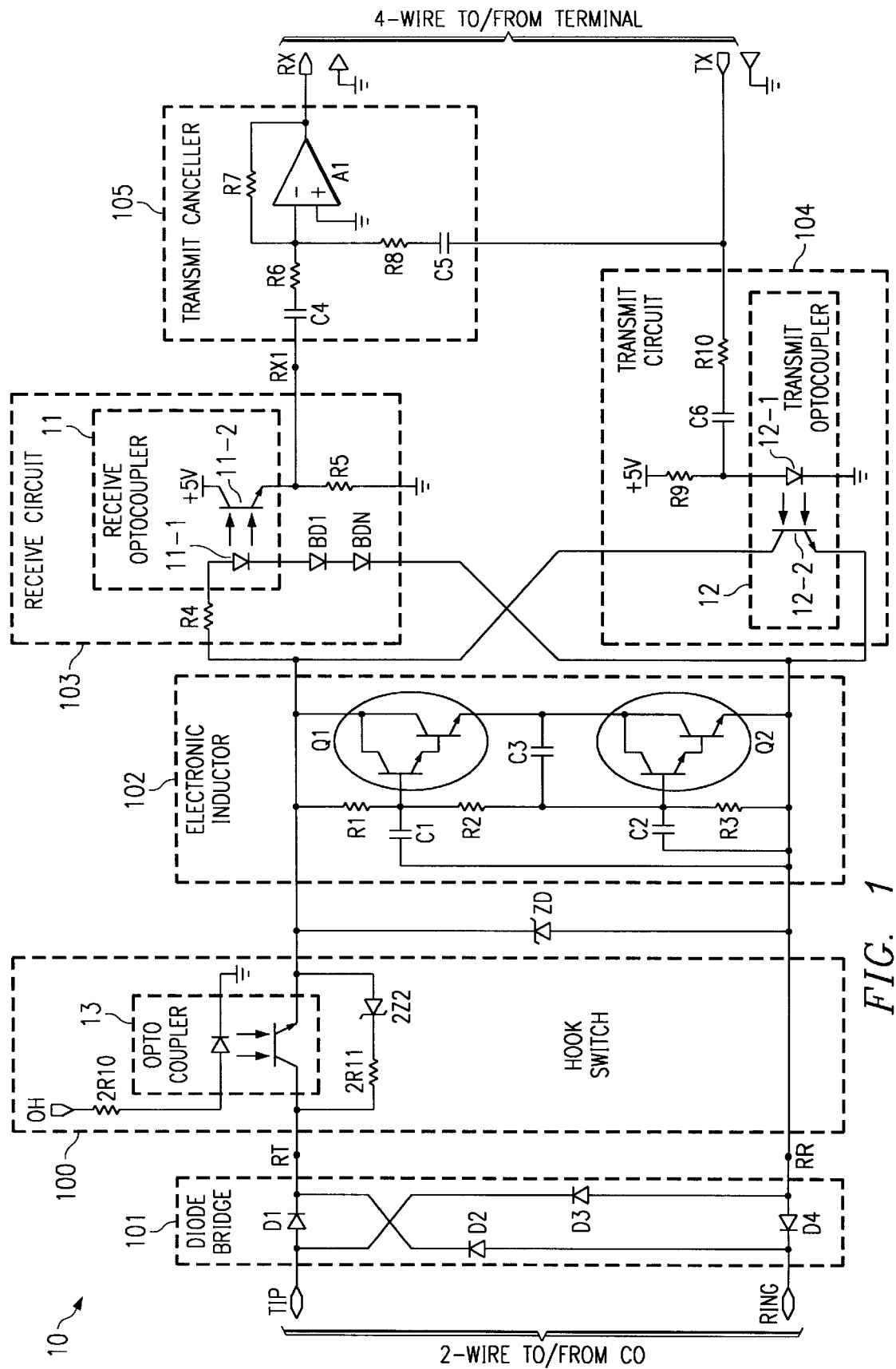
FIG. 1 is a schematic diagram of an optically coupled line interface.

In the preferred embodiment shown in FIG. 1, optical coupler 13, which advantageously is a darlington optical coupler with a Vceo breakdown voltage of 300 volts, collector current Ic of 150 MA and CTR of 4000%, is used as the hook switch for the circuit. The device generates the on-hook/off-hook signal via lead OH, which signal is used to control current through the photo emitter of optical coupler 13. When sufficient current flows through the photo emitter (input) of optical coupler 13 to cause the photo detector (output) 13 to conduct into saturation, the circuit goes into an off-hook state. To place the circuit in the on-hook state, the device removes current from lead OH and thereby removes the current through the photo emitter of optical coupler 13. In the on-hook state, the photo detector of optocoupler 13 is in a very high impedance state that it is advantageously an open circuit The optical coupler used for optocoupler 13 is advantageously one with a high enough breakdown voltage such that it will remain in an open circuit state for the highest voltage ring signal possible. Optocoupler 13 also must be able to handle a high enough collector current through the photo transistor to support maximum telephone line loop current, and a high enough CTR (current transfer ratio) so that the source current of the hook switch control output from the device is capable of switching it into saturation.

When a ring signal is present across Tip to Ring, 2R11/2Z2 series network causes a rectified and clipped version of the AC ring signal to be coupled around hook switch optical coupler 13. The value of the zener voltage of diode 2Z2 is high enough so that it will not conduct at the highest possible steady state DC voltage across the telephone line, but small enough so that it will conduct when the instantaneous voltage across Tip and Ring increases due to the presence of the superimposed AC ring signal upon the on-hook DC voltage of the telephone line. A zener diode with a 60 volt breakover will operate properly. This range can be between 56 and 66 volts. When zener diode 2Z2 conducts current, that same current will also pass through the photo emitter of optocoupler 11 and thus produce an equivalent current, scaled by the CTR of the optical coupler, in the photo detector of optocoupler 11.

The current flowing through photo detector of optocoupler 11 also flows through resistor R4 and causes a proportional voltage to be developed across resistor R4. The change in current through the photo detector of optocoupler 11 will be coupled through capacitor C1 to the Rx signal of the circuit Thus, a ring signal across input Tip and Ring will produce a rectified and clipped version of that ring signal at the Rx output of the circuit which will reflect the frequency and cadence of the ring signal present across the line at Tip and Ring to the output of line interface circuit 10.

Continuing in FIG. 1, the purpose of Electronic Inductor (EI) 102 is to absorb the excess DC loop current presented by the telephone line while passing nearly all of the AC signal to the coupling circuit. Electronic inductor 102 must bias LED (Light Emitting Diode) 11-1 of receive optocoupler 11 and photo-transistor 12-2 of transmit optocoupler 12 over the range of conditions provided by the telephone line. This range of operation is defined by the loop current, which can vary from approximately 20 to 100 mA. A further requirement on the electronic inductor is to provide a very high AC impedance, such that the maximum signal level is transferred to the receive optocoupler. The EI resides in the circuit after diode bridge 101 and zener diode ZD which clamps the voltage to a maximum level and is used to prevent severe over voltage conditions and after on-hook, off-hook control 100.

The EI circuit behaves inductively in that it presents a very low impedance to DC voltage but a very high impedance to AC signals, especially those in the band of interest. Thus, in the band of interest, nearly all of the signal energy is passed, typically 300 hz to 4000 hz, to receive circuit 103.

EI 102 uses two Darlington transistors Q1 and Q2 arranged in cascode fashion. A cascode circuit is used to obtain very high impedance between nodes RT and RR, which allows most of the signal energy to pass to LED 11-1 opto 11. Darlington transistors are used because they have very high betas (the ratio of collector current to base current), and consequently less base current and resulting in a smaller voltage drop across biasing resistors R1 and R2. Of course, other transistor arrangements, including single transistors or other active devices, could be used to achieve proper voltage regulation. Three resistors, R1, R2 and R3 are used to bias the EI 102. If the base currents of the transistors are negligible, then the voltage between RT and RR is computed as follows. The voltage across R3 is the base-emitter forward voltage of Q2, approximately 1.5V. This voltage sets the current in R3, as well as the current in R1 and R2. If the current in R3 is 1.5V/R3, then the voltage between RT and RR is (1.5V/R3)*(R1+R2)+1.5. Clearly, values of R1, R2 and R3 can be defined so that the voltage across EI 102 is approximately 5V.

Capacitors C1 and C2 are used to create the inductive effect by providing a shunt for AC signals. Thus, the voltage at the base of Q2, which sets the current of the EI, is sensitive only to changes in DC voltage between RT and RR. The values of C1 and C2 are set so that in the AC signals in the band of interest are completely shunted. Capacitor C3 reduces low frequency resonance of EI 102 by reducing the gain of Q2 at the point of resonance. C3 may not be required in all applications The receive circuit consists of opto 11, R4, biasing diodes BD1, BDn, and R5. While it is possible to configure a functional circuit without biasing diodes BD1, BDn and R5, optimum performance and greater design freedom are released through their deploy. The DC forward current is set by R4 and the biasing diodes. R4 is set to a value such that the overall input impedance of the circuit is 600 Ohms (for U.S.), typically around 700 Ohms because of finite output impedance of opto-112 and EI 102. The forward current, (IF) is multiplied in photo-transistor 11-2 by its CTR. Maximum linearity is achieved when the emitter of opto 11 is approximately 2.5V. This is achieved by setting R5 such that CTR*$I_f$*R5=2.5. $I_f$ is defined by the voltage across EI 102 and R4 and the biasing diodes. Biasing diodes are necessary since R4 must be set to about 700 Ohms to meet input impedance requirements. Thus, $I_f$=(VEI−VD1−VD2 . . . )/R4, where VDn is the forward drop across a diode, typically 0.7V. One or more biasing diodes are used in series depending on how much voltage is desired across R4.

The transmit circuit consists of opto 12, R9, C6 and R10. The circuit is biased by R9, which sets the DC forward current of opto 11 LED 12-1, and thus the quiescent collector current of opto 12's photo-transistor 12-2. Capacitor C6 provides DC isolation of the LED from the signal source, Tx such that the input impedance seen by Tx is R10.

Since the transmit circuit uses opto 12 in a common emitter configuration, the signal is inverted in passing from Tx to the telephone line. This is used to create a transmit cancellation circuit 105. The purpose of the transmit canceller 105 is to subtract the signal Tx from the signal received at Rx so that the signal input of Tx is not received back at Rx which could yield an objectionable echo back to the terminal. This subtraction could, if desired, be performed in software on a digital signal processor or microprocessor within the DC. Thus the invention does not require a hardware transmit canceller, however a simple means is shown here for completeness.

Transmit cancellation circuit 105 consists of op-amp A1 connected as a summing amplifier. Capacitors C4 and C5 serve to provide DC isolation. The function the circuit performs is to add the voltages Rx1 and Tx. The textbook equation for the summation is: Rx=(R7/R6)*Rx1+(R7/R8)*Tx. Note that Rx1 contains the signal to be received from, TIP/RING plus an inverted form of Tx such that if some factor of Tx is added to this signal, Tx will effectively be canceled. Thus R8 is set to be a value to provide the factor of Tx to achieve this cancellation.

Although the present invention and its advantages have been described in detail, it should be understood that various changes, substitutions and alterations can be made herein without departing from the spirit and scope of the invention as defined by the appended claims. For example, circuit 100 can be used with any type of line circuit whether or not such line circuit is optically coupled.

What is claimed is:

1. A line interface circuit
   means connected across said input for controlling the direction of current flow from said line;
   a semi-conductor contact connected between said current direction means and an output for placing said line circuit in the off-hook condition so that current can flow between said telephone line connected to said input and a device connected to said output; and
   an electronic inductor for terminating said telephone line, said electronic inductor presenting a low impedance to DC voltage and a high impedance to AC signals, said electronic inductor providing a regulated biasing voltage to both transmit and receive optocoupler circuits.

2. The circuit of claim 1 further including means in said circuit for limiting voltage spikes across said line.

3. The circuit of claim 1 further including
   means connected across said semi-conductor contact for allowing a clipped vector of AC signals present on said input to pass across said semi-conductor contact when said contact is in the non-current flowing state.

4. The circuit of claim 1 whereon said semi-conductor is an optocoupler.

5. The circuit of claim 4 whereas said semi-conductor is a darlington optocoupler.

6. The circuit of claim 3 wherein said allowing means includes a zener diode.

7. The circuit of claim 6 wherein said zener diode has a nominal breakdown voltage of 60 volts.

8. The circuit of claim 1 wherein said device connected to said output includes
   an input connectable to said output of said circuit;
   an output connectable to a communication device;
   said device having first and second connections connected to said input for terminating the telephone line voltage and current from said output of said circuit when said circuit is in said off-hook state said device further including;
   first and second optocouplers each connected across said input; said first optocoupler having one side of its input connected to said first connection of said circuit to control the impedance presented by said circuit to said telephone line via said connected input and the other side of its input connected to said second connection of said input, said second optocoupler having one side of its output connected to said first connection of said input and the other side of its output connected to said second connection of said input;
   wherein an output of said first optocoupler is connected to a receive portion of said communication device output and wherein the input of said second optocoupler is connected to a transmit portion of said communication device output.

9. The circuit of claim 8 further comprising:
   means connected between said output of said first optocoupler and said receive portion of said optocoupler for removing from said output those signals which have been received by said device via said transmit portion of said optocoupler.

10. The circuit of claim 9 wherein said removing means includes an op amp.

11. The circuit of claim 8 wherein at least one of said optocouplers has a controlled CTR.

12. The method of providing the switch hook function in a communication line circuit having an input connected to a communication line and an output connected to a utilization circuit and whereas said line circuit includes a semi-conductor operable for blocking communication signals received from said input when the line circuit is in the on-hook condition and operable for passing said communication signals when the line circuit is in the off-hook condition, said method comprising the steps of:
   receiving from said input an alternating alerting voltage;
   passing said received voltage across the open condition of said semi-conductor;
   providing a drive current from said utilization circuit for driving said semi-conductor into the off-hook condition, whereby said drive current remains separate from signals passed through said semi-conductor when said semi-conductor is in the off-hook condition; and
   terminating said communication line across an electronic inductor which presents a low impedance to DC voltages and a high impedance to AC signals, said electronic inductor providing a regulated biasing voltage to both transmit and receive optocoupler circuits.

13. The circuit of claim 12 further including the step of controlling the polarity of said alternating signal prior to said passing step.

14. The method of claim 12 wherein said semi-conductor is an optocoupler and wherein said providing step driving current is provided to the photo transmitting input of said optocoupler.

15. The method of claim 12 wherein said line circuit includes a zener diode connected across said semi-conductor and wherein said passing step includes the step of generating a clipped version of said alternating voltage for presentation to said utilization circuit.

16. The method of interfacing between a telephone line and a device, said method comprising the steps of:

receiving a communication signal over said telephone line and presenting said received signal to a hook switch circuit said circuit having a parallel connection of an optocoupler and a zener diode with the output of said hook switch circuit passing its output to one side of an electronic inductor, the other side of the electronic inductor connected to said telephone line;

passing said presented communication signals to an interface circuit having first and second connections connected across said electronic inductor, said interface circuit including first and second optocouplers each connected across said interface circuit; said first optocoupler having one side of its input connected to said electronic inductor to control the impedance presented by said interface circuit to said telephone line via said connected input and the other side of its input connected to said second connection of said interface circuit, said second optocoupler having one side of its output connected to said first connection of said interface circuit and the other side of its output connected to said second connection of said interface circuit;

wherein an output of said first optocoupler is connectable to a receive portion of said device and wherein the input of said second optocoupler is connectable to a transmit portion of said device;

bidirectionally presenting telephone line signals to and from said device through said switch hook when said switch hook is in the off-hook state; and passing only alerting signals from said telephone line to said device when said device is in the on-hook state.

17. An interface circuit for connection between a telephone line and a communication device, said circuit comprising:

a diode bridge for controlling the polarity of voltage signals on said telephone line;

an electronic switch hook connected to the output of said diode bridge, said bridge having means for passing in one direction alerting signals while said switch hook is in the on-hook state and for passing bidirectional communication signals when said switch hook is in the off-hook state;

means for receiving a drive current for controlling said on-hook and said off-hook states of said switch hook;

an electronic inductor connected to the output of said hook switch for terminating said telephone line, said electronic inductor operable for presenting a low impedance to DC voltage and a high impedance to AC signals, said electronic inductor providing a regulated biasing voltage to both transmit and receive optocoupler circuits;

means for presenting signals received from said telephone line to the LED portion of said receive optocoupler; and means for presenting signals received from said communication device to the LED portion of said transmit optocoupler.

18. The circuit of claim 17 wherein each said switch hook includes an optocoupler and wherein said drive current is supplied to the LED input of said optocoupler.

19. The circuit of claim 18 wherein the photodetector of said optocoupler is in series with said electronic inductor.

20. The circuit of claim 19 wherein said one direction passing means includes a zener diode connected across photodetector of said optocoupler.

21. The circuit of claim 20 wherein said zener diode is in series with a resistor.

22. The circuit of claim 18 wherein said optocoupler has a controlled CTR.

23. The circuit of claim 22 wherein said CTR is 4000%.

* * * * *